(No Model.)

J. A. KENDALL.
STEAM COOKER.

No. 510,798. Patented Dec. 12, 1893.

WITNESSES:
Donn Twitchell
C. Sedgwick

INVENTOR
J. A. Kendall
BY Munn & Co
ATTORNEYS.

UNITED STATES PATENT OFFICE.

JOHN A. KENDALL, OF MAYSVILLE, MISSOURI.

STEAM-COOKER.

SPECIFICATION forming part of Letters Patent No. 510,798, dated December 12, 1893.

Application filed January 9, 1893. Serial No. 457,793. (No model.)

*To all whom it may concern:*

Be it known that I, JOHN A. KENDALL, of Maysville, in the county of De Kalb and State of Missouri, have invented a new and Improved Steam-Cooker, of which the following is a specification, reference being had to the annexed drawings, forming a part thereof, in which—

Figure 1:
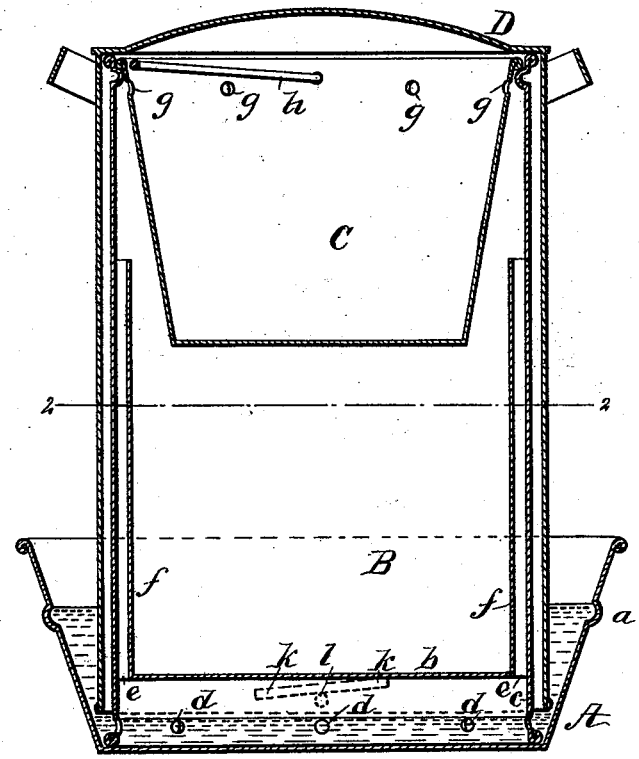
Figure 2:
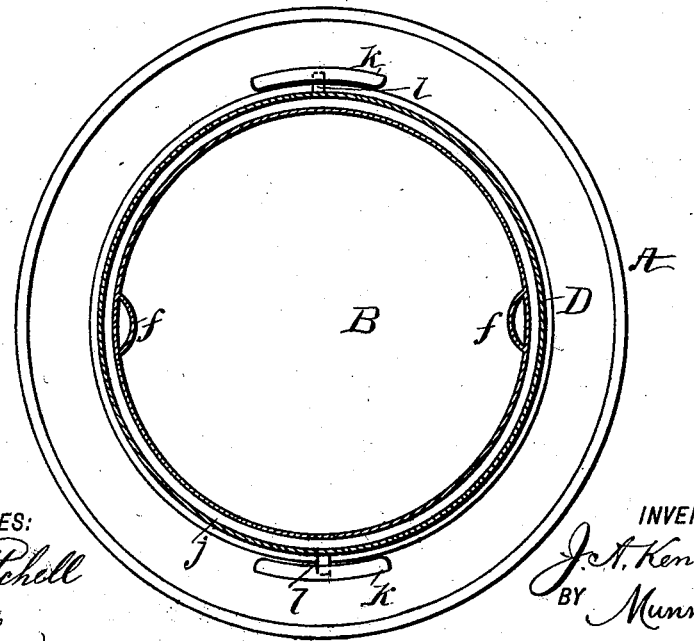

Figure 1 is a vertical transverse section of my improved steam cooker; and Fig. 2 is a horizontal section taken on line 2—2 in Fig. 1.

Similar letters of reference indicate corresponding parts in both views.

The object of my invention is to construct an efficient steam cooker, in which articles of food may be cooked without the loss of nutriment or flavor by evaporation, and prevent the odors of the cooking food from escaping and being distributed through the room, and that several articles may be cooked at the same time without the flavor of one article being communicated to another; and also in which the steam will be retained and condensed in the apparatus instead of being discharged into the air.

My object is also to slightly increase the pressure and temperature.

My invention consists in a water vessel, a cooking vessel fitted to the water vessel and provided with a cover extending down into the water contained by the water vessel, and in the combination with the steam chamber, of one or more food receptacles.

It also consists in a fastening device by means of which the steam chamber is secured to the water vessel, all as will be hereinafter more fully described.

The water vessel A, is preferably made in circular form with flaring sides, and is provided with a bead $a$, which serves as a mark for the level of the water. To the water vessel A, is fitted the steam chamber B, of cylindrical form, which rests upon the bottom of the vessel A, and is furnished with a bottom $b$, located a short distance from the lower edges of the side wall $c$ of the chamber B. The said side wall is perforated with holes $d$ near its lower edge, and near the bottom $b$ are formed apertures $e$, with which are connected steam conduits $f$, extending upwardly in the chamber B, a distance equal to about two thirds of the height of the chamber.

To the top of the chamber is fitted a food receptacle C, which in the present case is conical in form, but I do not limit myself to the form or number of such vessels placed in the chamber B. The receptacle C is provided with apertures $g$ in the walls thereof, near the top, for admitting steam from the chamber B. It is also furnished with a bail $h$, by which it may be lifted from the said chamber.

To the chamber B is fitted a cover D, the rim of which is prolonged downwardly to a point near the lower edge of the wall of the steam chamber B, so that the space between the cover and the chamber is sealed by the water contained in the water vessel A. The water vessel A is provided on diametrically opposite sides with oblique bars $k$ secured to the inner surface of the sides of the vessel, and the rim of the cover D is provided with studs $l$ on diametrically opposite sides, which engage the oblique bars $k$ on the said cover, in turn, thus fastening the cover and steam chamber in the water vessel.

Articles to be cooked are placed in the chamber B, or in the receptacles C suspended in the chamber, and the water vessel A is filled with water up to the bead $a$. The cooker being placed upon the stove or range, steam is generated in the lower part of the chamber B. The steam escapes through the conduits $f$ to the chamber B, where it is distributed among the contents of the chamber. It also enters the receptacle C. Any increase in pressure above that due to the column of water in the vessel A, causes a portion of the steam in the space between the bottom $b$ and the surface of the water below to pass out through the perforations $d$ into the water, where it is condensed.

Having thus described my invention, I claim as new and desire to secure by Letters Patent—

1. The combination with the steam chamber and the water vessel having oblique bars $k$, of the cover inclosing the steam chamber and having outwardly projecting pins at its lower edge engaging the said bars and locking the parts, substantially as set forth.

2. The combination with the water vessel, the steam chamber resting therein and provided near its lower edge with apertures $d$, an imperforate bottom $b$, above the apertures and the steam passages extending upwardly along the inner walls of the steam chamber to the upper part thereof, a cover inclosing the said steam chamber with the lower edge of its depending flange entering the water vessel and fastening devices for connecting the cover flange to the water vessel, substantially as set forth.

3. The combination with the water vessel of the steam chamber resting therein and having lateral apertures $d$ in its lower end opening into the water space, an imperforate bottom $b$ above said apertures and steam passages $f$ leading from below the bottom into the upper part of said steam chamber, and the cover provided with a depending flange inclosing the steam chamber and entering at its lower end the said vessel, substantially as set forth.

4. In a steam cooker, the combination of the water vessel A, steam chamber B provided with the bottom $b$, conduits $f\ f$, and having apertures $d$, in the wall thereof, the cover D, food receptacle C, and a fastening device for securing the cover D to the water vessel, substantially as specified.

JOHN A. KENDALL.

Witnesses:
SAM. DE VILLE,
A. B. CHRISMAN.